United States Patent [19]
Klotz, Jr.

[11] Patent Number: 5,642,473
[45] Date of Patent: Jun. 24, 1997

[54] PAPER SAVING REPROGRAPHIC DEVICE

[75] Inventor: Leigh L. Klotz, Jr., Palo Alto, Calif.

[73] Assignee: Xerox Corporation, Stamford, Conn.

[21] Appl. No.: 324,814

[22] Filed: Oct. 17, 1994

[51] Int. Cl.⁶ ............................................. G06K 15/00
[52] U.S. Cl. .................................... 395/117; 395/102
[58] Field of Search .................... 395/102, 117,
395/112, 114, 115, 116, 110, 105, 101,
139, 144, 145, 146, 147, 148, 151, 133,
135; 345/127–130, 189, 190, 191; 382/176,
180, 293; 358/452, 453, 448

[56] References Cited

U.S. PATENT DOCUMENTS

| | | | |
|---|---|---|---|
| 4,196,450 | 4/1980 | Miller et al. | 358/448 |
| 4,302,782 | 11/1981 | Gunning et al. | 358/296 |
| 4,656,602 | 4/1987 | Berkland et al. | 395/117 |
| 5,113,488 | 5/1992 | Bischel et al. | 395/112 |
| 5,115,493 | 5/1992 | Jeanblanc et al. | 395/117 |
| 5,167,016 | 11/1992 | Bagley et al. | 395/144 |
| 5,396,566 | 3/1995 | Bruce et al. | 382/187 |
| 5,455,686 | 10/1995 | Nagano et al. | 358/404 |
| 5,528,732 | 6/1996 | Klotz, Jr. | 395/106 |

FOREIGN PATENT DOCUMENTS

| | | | |
|---|---|---|---|
| 434930A2 | 7/1991 | European Pat. Off. | G06F 15/72 |
| 585073A2 | 3/1994 | European Pat. Off. | H04N 1/387 |

OTHER PUBLICATIONS

Simpson, Alan, "Mastering WordPerfect 5.1 & 5.2 for Windows", 1993, Chapter 4, pp. 96–98.

*Primary Examiner*—Edward L. Coles, Sr.
*Assistant Examiner*—Dov Popovici
*Attorney, Agent, or Firm*—Richard B. Domingo

[57] ABSTRACT

A reprographic device having means for eliminating undesired spacings between lines of text in copies of a source medium. Such means will often have the desired effect of reducing the number of pages in a multi-page document. The present invention accomplishes this by scanning the multiple pages to create bit-mapped images, segmenting the images to identify lines of text and graphics, identifying a distance X between segments, identifying a segment spacing factor which will cause reduction in the spacing between lines of text, laying out the segments in a print page memory so that the segments are separated by a distance based on the distance X and the segment spacing factor and printing out the contents of the page memory.

13 Claims, 7 Drawing Sheets

PAPER SAVING REPROGRAPHIC DEVICE

FIELD OF THE INVENTION

The present invention relates to the field of digital reprographic devices, in particular to reprographic devices having the capability of altering an image on an medium.

BACKGROUND OF THE INVENTION

The low cost method of choice for copying a source medium is light lens xerography. Light lens xerography is a well known process by which a source medium is flood illuminated or scanned with light and the reflections therefrom are imaged via a copy lens assembly to a charged photoconductive medium, which is then discharged onto an output medium in accordance with the image formed on the source medium. A characteristic of the light lens xerographic process is that the image on the source medium and the resultant copying medium are either identical or are scaled (i.e. either enlarged or reduced). While this may be acceptable for most copy operations, there do exist situations where it would be desirable to have the copy different from the original. For example, when a single spaced document has been received for review and comment, it may be helpful to have room to write comments, corrections or other annotations between the lines. Conversely, when a multiple page document to be copied has excessive unused space, it may be desirable to remove the unused space and combine pages.

Performing such functions would be difficult using conventional light lens copying techniques. However, reproduction systems (e.g. digital copiers) that scan a document to convert it to a digital form prior to printing provide a base platform for such capabilities. One such system is described in U.S. Pat. No. 4,302,782 entitled "Reproduction Scanning System Having Intermediate Storage Between Input and Output Scanning Stations" (hereinafter the '782 patent). The '782 patent describes a reproduction system which utilizes optical scanning technology to obtain a document image, which is stored in an intermediate storage prior to transmittal to an output scanning station for printing. The system of the '782 patent may be used to magnify and enlarge source images. However, the '782 patent does not suggest any manipulation of image data stored in the intermediate storage.

Analysis of bit-mapped representations of text data is well known. Optical Character Recognition (OCR) is used to analyze bit-mapped representations of text data in order to translate into some character coding scheme (e.g. ASCII codes). OCR techniques typically require the segmentation of the bit-mapped representation into units such as paragraphs, lines of text and character blocks. The actual recognition is performed on the character blocks. OCR allows the resulting text to then be edited and used in commercially available word processing programs. OCR programs when used in combination with word processing programs could be used to perform the functionality of creating single or double spaced copies. However, OCR programs requires extensive processing time and do not preserve images (e.g. illustrations or photographs), handwritten marks or other non-text markings that may be on the original medium would require a great deal of processing time and would be impractical to implement on a reprographic device.

EP-A 434,930, Bagley et al. entitled "Editing Text In An Image" describes a system for editing text on the bit-mapped representations without the need to covert characters to codes. The system described in EP-A 434,930 is premised on manipulating text and does not disclose a technique for single or double spacing. Further, the system described is for use as an interactive editor when viewing the contents of the bit-mapped representation on a computer screen, rather than as a function on a copier or other reprographic device.

Reformatting of text based on a bit-mapped representation of an image is described in EP 0 585 073 A2, Card entitled "Automatically Changing Text Characteristics By Repositioning Word Images". In EP 0 585 073 A2, first image data is changed according to change data indicating the desired changes to the text. The technique described in EP 0 585 073 A2 operates on word images which may be inefficient for the application of the present invention and does not preserve images (e.g. illustrations or photographs), handwritten marks or other non-text markings that may be on the original medium.

The prior art does not teach or suggest providing automatic adjustment of the spacing between lines of text based on an analysis of the bit mapped representation of the text. Thus, it would be desirable to provide a copying system which is capable of efficiently creating double or single spaced copies and which preserves images, handwritten marks and other non-text markings on the original medium.

SUMMARY OF THE INVENTION

A reprographic device having a feature for saving paper is disclosed. Often, documents are double or triple spaced (e.g. edit versions on which written annotations will be made.) There are often times when the extra spaces are not needed (e.g. it is for reference and no annotations will be made.) In such a situation, when copies of such documents are produced, this wasted space often results in extra unneeded pages being generated. The present invention enables the saving of paper through means for decreasing the amount of space between lines of text when copying a multi-page document. The saving of paper provides the added benefit of reducing the physical storage requirements for maintaining the copy of the document.

The present invention saves paper by eliminating unnecessary space between lines of text. Such unnecessary spaces are eliminated by scanning the multiple pages to create bit-mapped images, segmenting the images to identify a plurality of segments representing lines of text, identifying a distance X between adjacent segments, identifying a segment spacing factor which will cause reduction in the spacing between lines of text, laying out the segments in a print page memory so that the segments are separated by a distance based on the distance X and the segment spacing factor and printing out the contents of the page memory.

DETAILED DESCRIPTION OF THE PREFERRED EMBODIMENTS

A reprographic device for creating a copy of a multi-page document so that the spacing between lines of text is reduced and pages combined, resulting in a reduction of the number of pages for the document is disclosed. In the following description numerous specific details are set forth, such as address coordinates of a segment in a bit-mapped representation, in order to provide a thorough understanding of the present invention. It would be apparent, however, to one skilled in the art to practice the invention without such specific details. In other instances, specific implementation details, such as source medium scanning and the transfer of the copy image to an output medium, have not been shown in detail in order not to unnecessarily obscure the present invention.

The present invention may be implemented on any reprographic device, such as a copier, facsimile device, or on a computer system. The foregoing description of the currently preferred embodiment is not meant to be limiting as to the spirit and scope of the present invention. While the application described is one where double spaced text is converted to single spaced text, it would be apparent to one skilled in the art to to cause triple spaced text to be converted to space and a half or single spaced text. Moreover, the present invention could be applied to writing systems which are vertically oriented (e.g. Japanese or Chinese) or to documents comprised primarily of graphical segments or even text with a graphics segment. The present invention may even be implemented as part of another function. For example, a reduction function may incorporate the present invention in order to make the smallest possible copy. Such implementations would not cause a departure from the spirit and scope of the present invention.

This application is related to co-pending application entitled "A Reprographic Device For Making Copies With Multi-Spaced Lines", Ser. No. 08/324,812, now U.S. Pat. No. 5,528,732.

Figure 1:
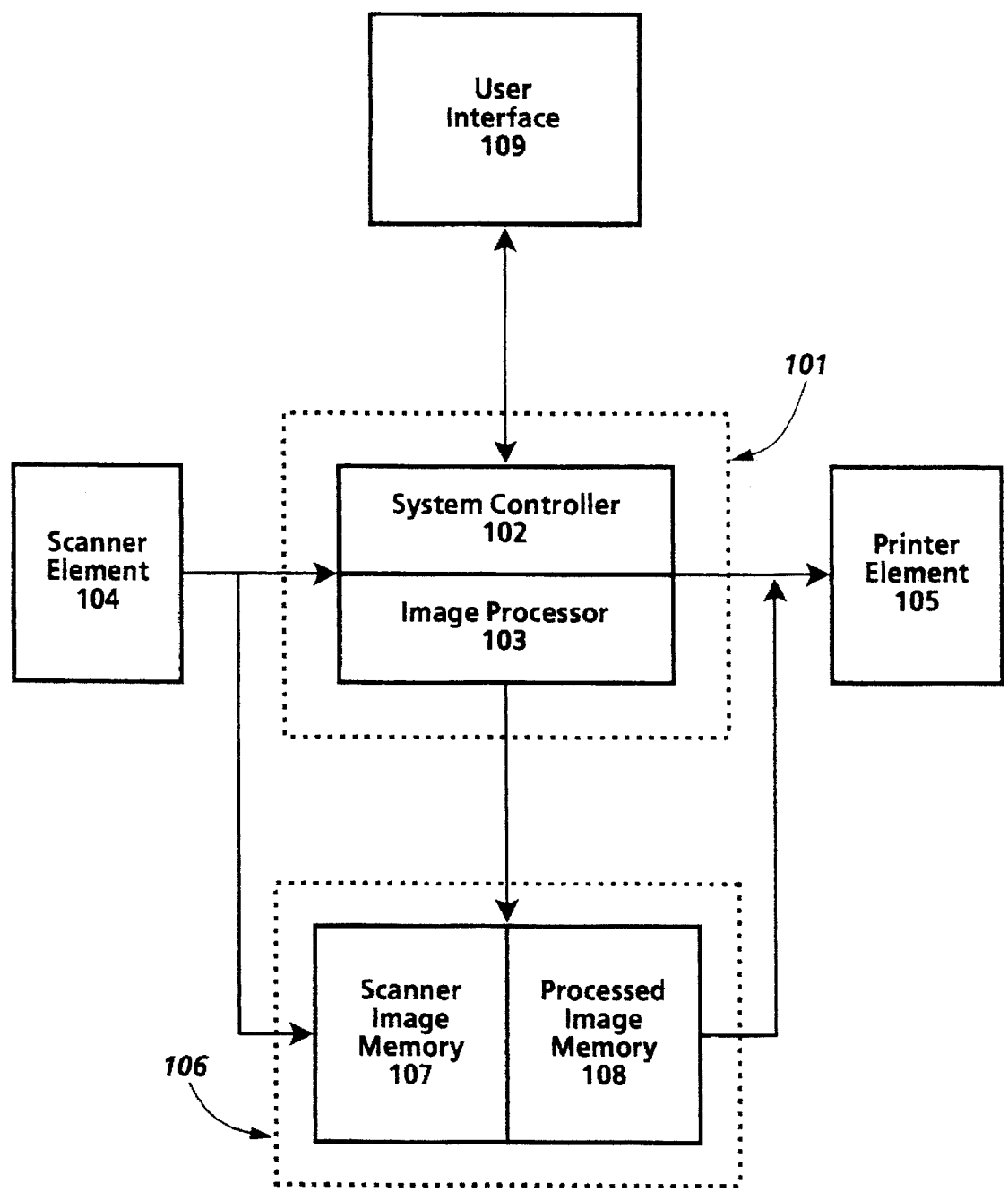
FIG. 1 is a block diagram illustrating the major functional elements of a reprographic device of the currently preferred embodiment of the present invention.

Overview of Reprographic Device of the Currently Preferred Embodiment of the Present Invention The reprographic device of the present invention is described with reference to FIG. 1. Referring to FIG. 1, a processing unit 101 performs the various processing functionality required by the reprographic device. The processing unit 101 is broken down into system controller 102 and image processor 103. The system controller 102 controls the operation of the reprographic device and the interaction between the various other components. The image processor 103 manipulates images which have been input via a scanner element 104. As will be described in greater detail below, the image processor 103 may also include means for identifying a scanned medium as a form. Such a form provides a user interface by which a user can specify that desired functions be performed. The processing unit 101 may be a single physical component, e.g. a microprocessor, or it may be two separate components performing the system control and image processing functions.

The reprographic device is further comprised of the aforementioned scanner element 104. The scanner element 104 is used to create a bit-mapped representation of a medium at a predetermined resolution. The predetermined resolution may be fixed or it could be adjustable by the user. When created, the bit-mapped representation is stored in a scanner image memory 107 of storage unit 106. The storage unit 106 is preferably some type of solid state random access memory. However, other type of memory technology could be utilized, e.g. magnetic or optical memory, without departing from the spirit and scope of the present invention. A second part of storage unit 106 is processed image memory 108. The processed image memory 108 is used to store the resulting image after it has been processed by image processor 103. Although not illustrated the storage unit 106 may also contain workspace storage for storing various in-process data. Such in-process data would include data indicating positional locations of lines of text in the source medium.

When the image is to be printed, the processed image from the processed image memory 108 is provided to the printer element 105. The printer element 105 may utilize any of a number of printing technologies such as xerography or ink-jet.

While the currently preferred embodiment discloses creating a bit mapped representation of a medium via scanner element 104, a bit-mapped representation of a medium received from an external source (e.g. an incoming fax) may be stored in storage unit 106 for processing. Further, while printing of the processed image is disclosed, it would be apparent to one of skill in the art to provide the processed image to other output devices such as a Facsimile device.

Finally, the reprographic device will include a user interface 109 for allowing a user to enter commands and/or copy criteria. For example, the number of copies, contrast, output paper size and enlargement/reduction are all functions that may be specified. User interfaces for invoking the functionality of the present invention is illustrated with reference to FIGS. 2–3.

Figure 2:
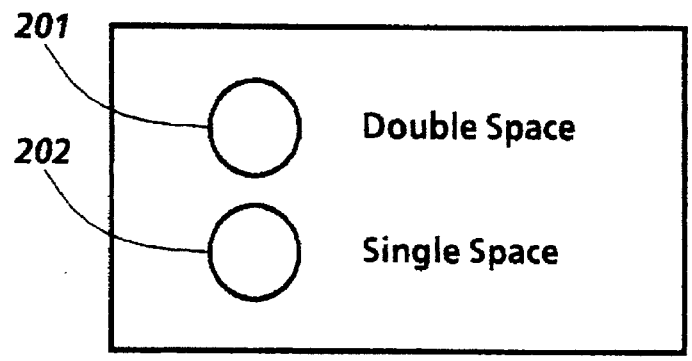
FIG. 2 is an illustration of a first embodiment of a user interface that may be utilized to invoke functionality provided by the present invention by the currently preferred embodiment of the present invention.

Referring to FIG. 2, a user interface for invoking the functionality of the present invention is comprised of a pair of labeled switches. In FIG. 2, the switches are labeled "Double Space" 201 and "Single Space" 202. When the "Double Space" 201 switch is depressed when performing a duplication, the spacing between lines of text and graphics will be doubled. So for example, if the existing spacing is single spaced, the result will be text that is double spaced. In so doing, it is likely that the doubling will result in the number of pages doubling.

When the "Single Space" 202 switch is depressed, the spacing between lines of text and graphics will be halved. So for example, if the existing text is double spaced the result will be single spacing. In so doing, it is likely that the number of printed pages required will be reduced.

The switches used may be physical switches or soft switches embodied on a touch screen display. In any of the embodiments a user would "touch" the switch in order for it to be invoked.

Figure 3:
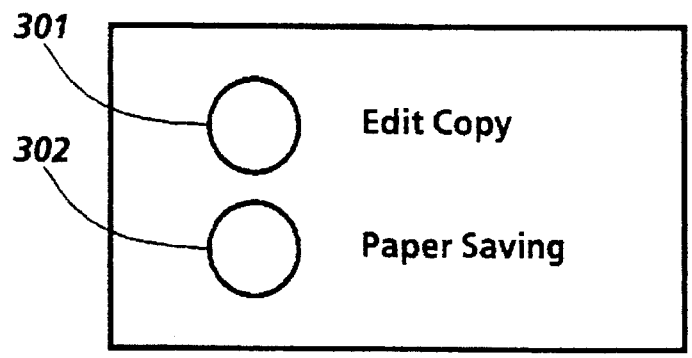
FIG. 3 is an illustration of a copy of a second embodiment of a user interface that may be utilized to invoke functionality provided by the currently preferred embodiment of the present invention.

The labeling of the switches may take another name, as illustrated in FIG. 3. Referring to FIG. 3, the "Double Space" 201 switch of FIG. 2 is renamed as "Edit Copy" 301. Here the name infers a user purpose for the function, namely to create an editable copy where comments and changes may be readily inserted. In a similar fashion, the "Single Space" switch 202 of FIG. 2 has been renamed "Paper Saving" 302. This connotes that the copy being made should be performed so as to reduce the number of pages that will be used to print out the desired text.

As illustrated by FIGS. 2 and 3, the present invention may be labeled by various feature types or names on a reprographic device. The present invention may be known by different names or labels, and such different names or labels do not cause departure from the spirit and scope of the present invention.

Figure 4:
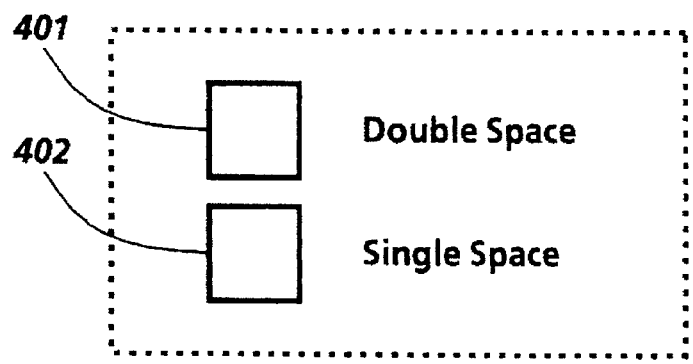
FIG. 4 is an example of a form checkbox as may be part of a paper user interface that may be utilized to invoke functionality provided by the currently preferred embodiment of the present invention.

The present invention may also be practiced using a paper based user interface on a form. Such a paper based user interface is described in U.S. Pat. No. 5,060,980, entitled "Form Utilizing Encoded Indications For Form Field Processing." In such a user interface, the functionality of the physical switches are replaced by checkboxes on a form. As mentioned briefly with respect to FIG. 1, in such an implementation the image processor of the reprographic device would further include a form recognition and processing means which would be used to interpret the form. The actual printed checkbox utilized on a form could be as illustrated in FIG. 4, wherein a user would place a written mark on the desired "box", i.e. either of checkboxes 401 or 402.

Double Spacing/Edit Copy

Figure 5:
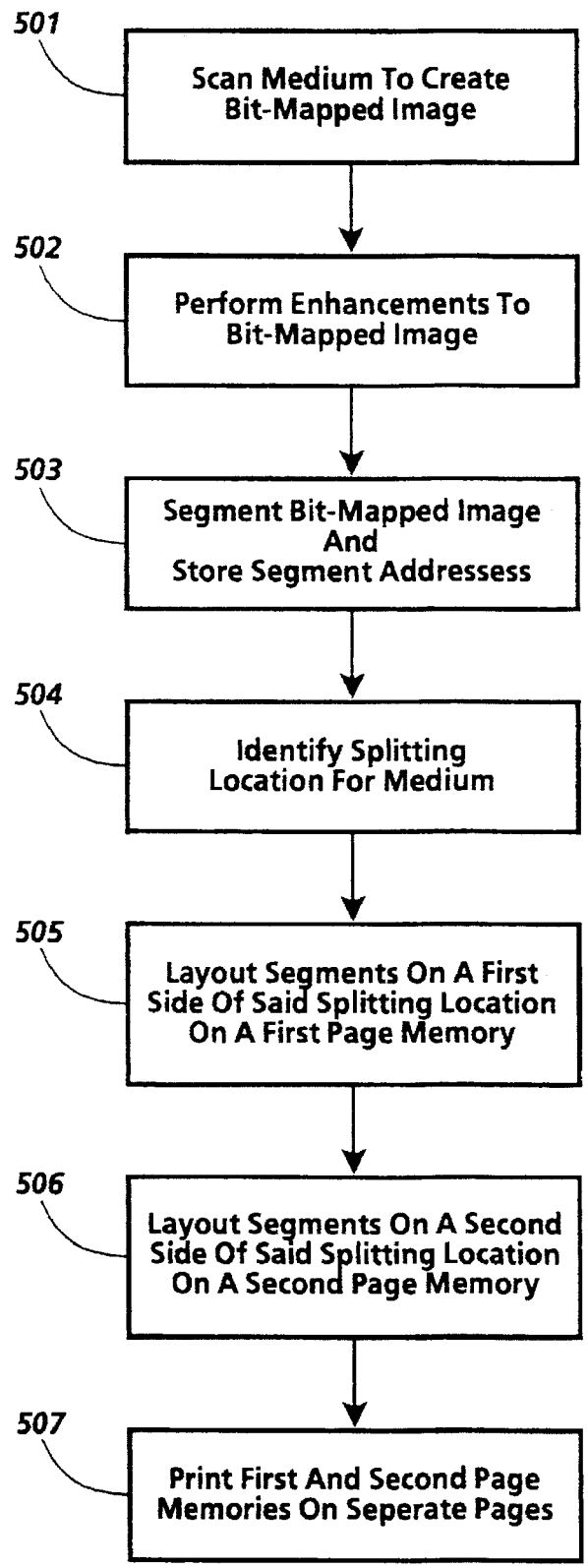
FIG. 5 is a flowchart outlining the steps for increasing the distance between segments on a medium, resulting in the contents of a single page to be spread across multiple pages, as may be performed in the currently preferred embodiment of the present invention.

FIG. 5 illustrates the preferred steps performed when creating a double spaced or edit copy. Referring to FIG. 5, the document medium is scanned to create a bit-mapped representation of the medium, step 501. If the document medium contains multiple pages, each of the mediums would be individually scanned and the remaining steps performed on each of the separate representations. In any event, once each of the documents has been scanned, enhancements may be performed on the bit-mapped image, step 502. Such document enhancement may include skew correction, pepper (dirt or noise) removal or contrast changes. Once the enhancement have been performed, the bit-mapped representation is segmented and the resulting addresses stored, step 503. In the present invention, the segmentation will occur so that lines of text and graphical blocks are segmented. In the present invention the projection profile segmentation method is used. However, any suitable segmentation method may be used by the present invention without causing departure from the spirit and scope of the present invention. In any event, once the segmentation occurs the address coordinates for a bounding box of the segment are stored. Generally, as the bounding box is rectangular, only the upper left and lower right coordinates need be saved.

Next, a splitting location for the medium is located, step 504. The splitting location will be comprised of the coordinates of a spatial address on the medium. In any event, only a single splitting location is found because only double spacing is provided. However, it would be apparent to one skilled in the art to provide for more than double spacing, since it would be a matter of locating two or more splitting locations. Such implementations would not cause departure from the spirit and scope of the present invention. In any event, the splitting location of currently preferred embodiment would be the vertical middle of a page. Note that if text was segmented in columns, as found in Japanese text, the splitting location chosen would be the horizontal middle of a page.

Once, the splitting location is identified, the segments on a first side of the splitting location are laid out, i.e. organized, onto a first page memory representing a first page to be printed, step 505. For page layouts that have horizontal lines of text across the page, the segments above the splitting location are identified as being on the first side. Alternatively, for page layouts having text in columns, the segments to the right of the splitting location could be on the first page memory. Determining if a segment is on a first side of a splitting location would be performed by comparison of the splitting location address to the segment address. The actual layout of segments on page memory is described in greater detail below with respect to FIG. 6. The identical process is then carried out for segments on a second side of the splitting location, step 506. When the layout of the pages is completed, the first and second page memories are printed out, step 507.

Figure 6:
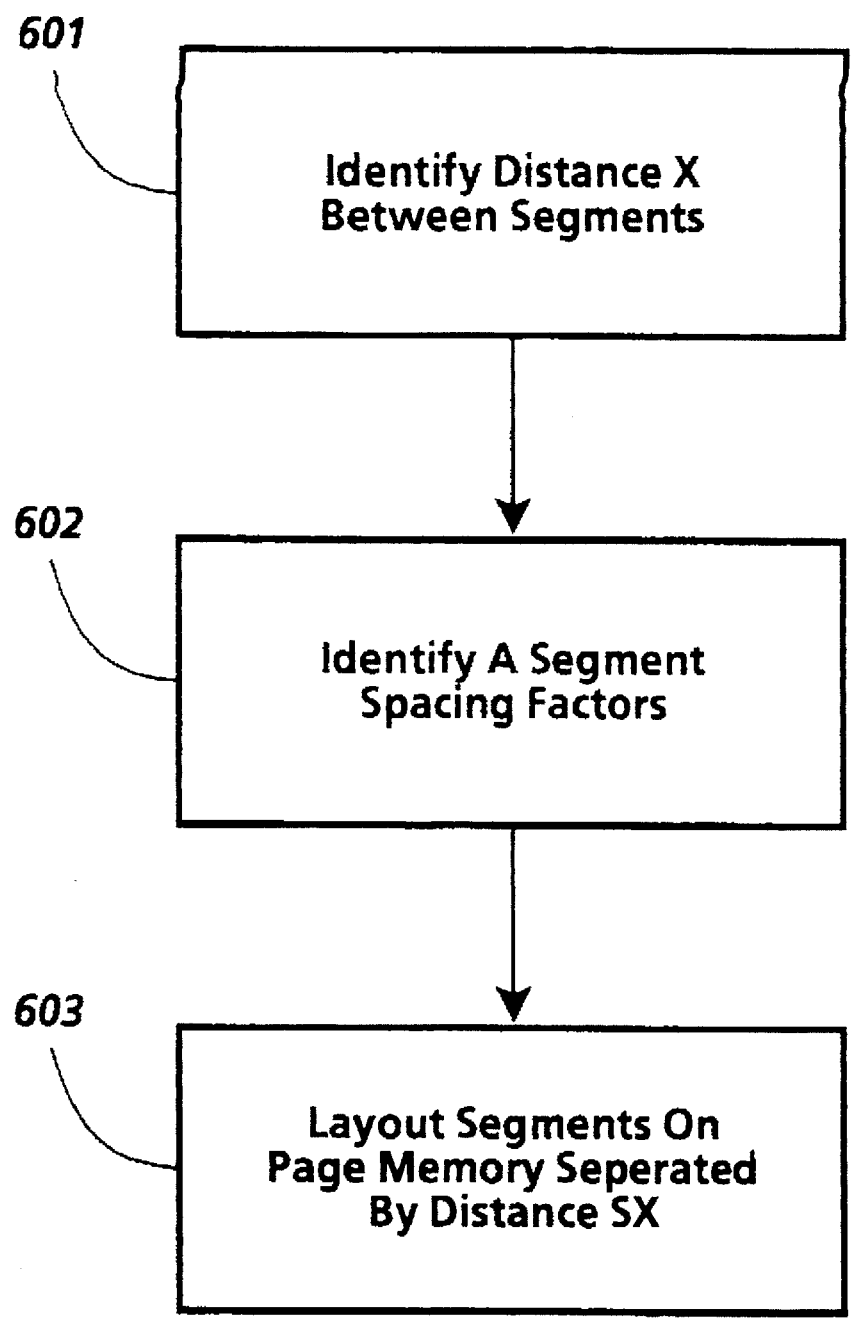
FIG. 6 is a flowchart outlining the steps for laying out segments on a page memory as may be performed by the currently preferred embodiment of the present invention.

FIG. 6 is a flowchart outlining the steps for laying out the segments on a page memory. Referring to FIG. 6, a distance X between the segments is identified, step 601. The distance X may be identified by either comparing the addresses of two text line segments or by averaging the distances between multiple text line segments. Next, a segment spacing factor S is identified, step 602. The segment spacing factor S relates to the desired distance by which the spacing is increased. For example, if converting to double space, the segment spacing factor would be 2. The spacing factor would be provided by the user (e.g. by depression of the double space button of FIG. 2). Finally, the segments are placed onto page memory separated by a distance SX, step 603.

As an example, assume that a first text segment at the top of the page has an address (1,1), (10,80) and a second text segment has address (20,1), (30,80), where (1,1) is at the upper left corner of an X-Y plane defining the page. Further assume that the segment spacing factor is S=2. In order to determine the distance between the first and second segment, the lower right address coordinate (10, 80) of the first text segment is compared to the upper left coordinate of the second text segment (20,1). The distance will be reflected by the difference of the ordinate axis value (reflecting the "row" on which the segment starts). So comparing(20,1) with (10,80) a first ordinate difference of 10 is obtained. So in this case X=10. When placing segments onto the page memory, the distance will be SX=2(10)=20. Thus, the first text segment will be placed at its original location i.e. (1,1), (10,80), all subsequent text segment addresses on the page will have 20 added to the lowest ordinate axis value as they are placed in page memory, e.g. the second text segment will be placed at (30,1), (40,80) and the segment after that would be at (60,1), (70,80), etc.. Note that segments placed on the second page will require adjustment of their ordinate address in order to reflect their new page position (e.g. text segments formerly in the middle of a page are now at the top of a page). These is accomplished by merely altering, i.e. subtracting by a suitable amount, the ordinate axis values as the segments are laid out.

It should further be noted that this layout step may also include other steps to insure that blank pages are not printed out. For example, an original page may only have text on the top half. The present invention will check to see if any segments are placed in the second page memory prior to print out. If no segments are detected, the page will not be printed out.

While the preferred embodiment is carried out as described in the flowcharts of FIG. 5 and 6, the present invention may be implemented in alternative embodiments. Such alternative embodiment would not cause a departure from the spirit and scope of the present invention. For example, the laying out of segments could be carried out so that the double spacing is incurred without reference to a midpoint. Segments could be laid out on in page memory so as to completely fill a first page and subsequent segments being laid out on a second page. However, such an embodiment may cause some confusion as to the source of the "original" page so some page indicator in the segments may have to be included.

Figure 7:
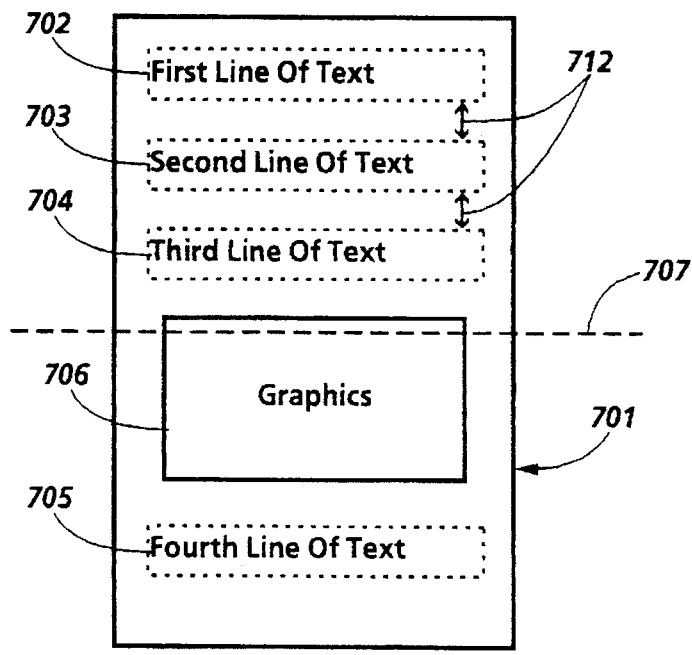
FIG. 7 is an example which illustrates a medium prior to having the distance between segments increased.
Figure 8:
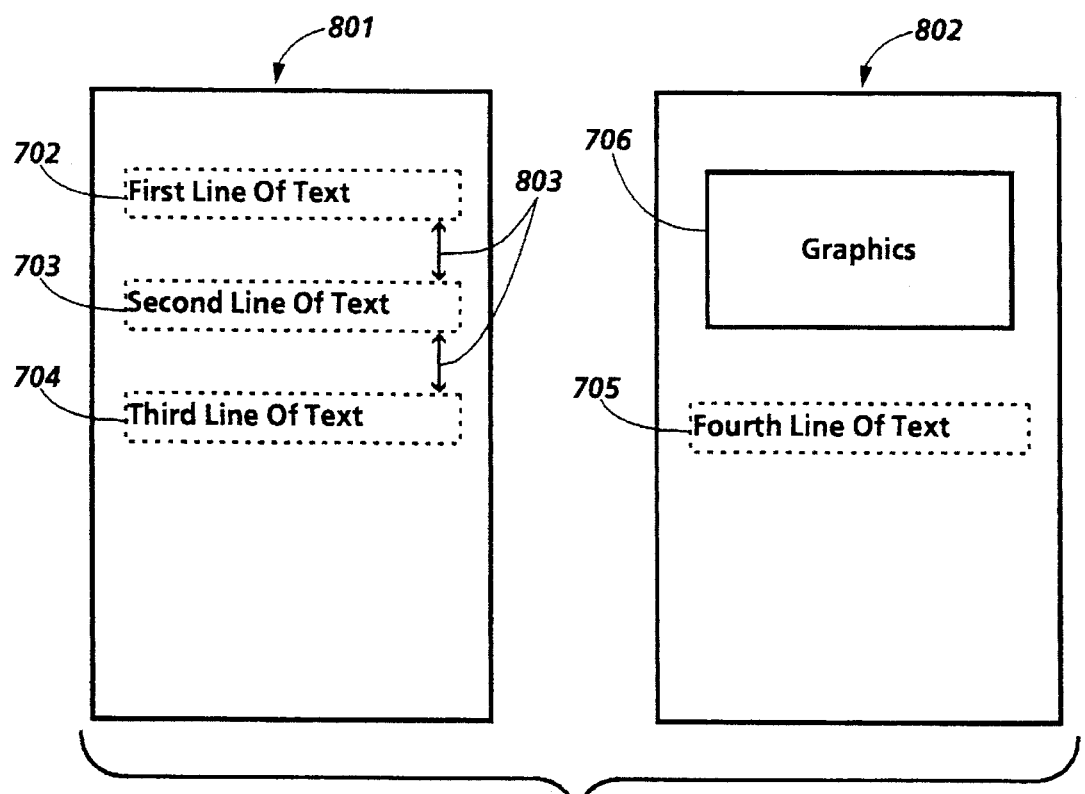
FIG. 8 illustrates the result of increasing the distance between the segments of the medium illustrated in FIG. 7.

FIGS. 7-8 illustrates converting a single spaced document to a double spaced document as may be performed in the currently preferred embodiment of the present invention. Referring to FIG. 7, a page 701 contains a plurality of segments, namely a first line of text 702, a second line of text 703, a third line of text 704, a fourth line of text 705 and graphics 706. Also illustrated in FIG. 7 is splitting location 707. The splitting location 707 is vertically positioned on page 701 because the lines of text run horizontally across the page. Finally, the distance between the first line of text 702 and the second line of text 703, as well as the distance between second line of text 703 and third line of text 704 is illustrated as distance X 712.

Referring now to FIG. 8, the page 701 of FIG. 7 has been split into first page 801 and second page 802. When comparing FIGS. 7 to 8 it is readily observed that each of the segments entirely above splitting location 707 of FIG. 7 are printed on first page 801 and everything on or below splitting location 707 of FIG. 7 are printed on second page 802. Finally, on first page 801, the distance between first line of text 702 and second line of text 703, as well as the distance between second line of text 703 and third line of text 704 has been doubled and is denoted as distance 2X 803.

Although not illustrated, the bottom of the page for each of the new pages may have attached a new page number reference. The most efficient way is to simply add new page numbers (much like what Facsimile machines do) or allow a user could specify a starting point for the numbering scheme. Alternatively, page numbers could be automatically created which have some reference to the original page number. For example, if the original page was page 1, the new pages could be denoted as 1.1 and 1.2. This would allow easy reference to the original page but would require recognition of page numbers (which may be computationally intensive.)

Single Spacing/Paper Saving

The paper saving mode of operation is one that is used to eliminate or reduce blank spaces between lines of text on pages, and/or combine multiple input pages onto a single output page.

Figure 9:
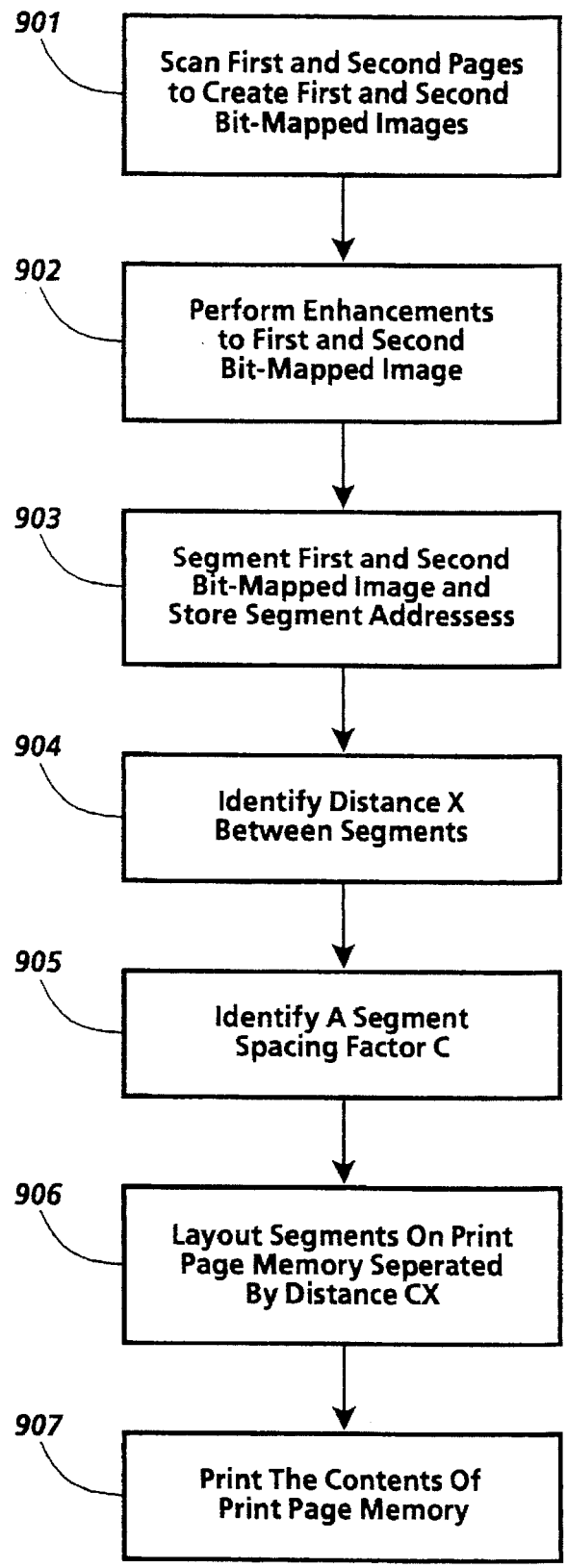
FIG. 9 is a flowchart outlining the steps for reducing the distance between segments on a medium, resulting in the contents of multiple pages to be printed on a single page, as may be performed in the currently preferred embodiment of the present invention.

The second mode of operation of the reprographic device of the present invention may be used to convert double spaced copies to single spaced copies, or otherwise reduce the amount of white space between segments on a page. Here, a desired effect is to reduce the number of printed pages. The basic steps for the paper saving mode of operation is illustrated with reference to FIG. 9. FIG. 9 is an example where two pages are mapped onto a single page for print out. Referring to FIG. 9, first and second pages are scanned to create first and second bit-mapped images, step 901. Any desired image enhancements may then be performed on the first and second bit-mapped images, step 902. A desirable image enhancement would be the detection and elimination of stray markings, e.g. dirt or noise, that are not part of the document page. In any event, after any image enhancements, the first and second bit-mapped images are then segmented and stored, step 903. It should be noted that the steps 901-903 are identical to those performed for increasing spacing as described in FIG. 5. These steps are basically the steps undertaken to digitize and segment the image. In any event, once the pages have been digitized and segmented, a distance X between the segments is identified, step 904. This distance X may be any distance, but in this example it refers to the double spacing of a double spaced document. Next, a segment spacing factor C is identified, step 905. The segment spacing factor C is the scaling value by which the spacing between text line segments is reduced. In this example, the spacing factor C would be one-half (or 0.5). The segments extracted from the first and second bit-mapped images are then laid out on a print page memory separated by a distance CX, step 906. This will effectively result in the first and second pages to be combined onto a single page. Finally, the contents of the print page memory are printed, step 907.

Of course, the steps of FIG. 9 may be modified by one of ordinary skill in the art to reduce more pages, e.g. three pages having triple spaced text to a single page, etc.. Moreover, the present invention is generalized so that a document comprised of a plurality of pages is reduced to create a document with fewer pages. For example, a ten (10) page document could be converted into a five (5) page document.

The following is an example of processing segments to cause double to single spacing. It is similar to the example above with respect to single to double spacing. Assume that a first text segment at the top of the page has an address (1,1), (10,80) and a second text segment has address (30,1), (40,80), where (1,1) is at the top left corner of an X-Y plane defining the page. Further assume that the segment spacing factor C=½. In order to determine the distance between the first and second segment, the lower right address coordinate (10,80) of the first text segment is compared to the upper left coordinate of the second text segment (30,1). The distance will be reflected by the difference of the ordinate axis value (reflecting the "row" on which the segment starts). So comparing(30,1) with (10,80) a first ordinate difference of 20 is obtained. So in this case X=20. When placing segments onto the page memory, the distance will be CX=(½)20=10. Thus, the first text segment will be placed at its original location i.e. (1,1), (10,80) and all subsequent text segment addresses will have 10 added to the lowest ordinate axis value from the immediately prior image segment placed in page memory, e.g. the second text segment will be placed at (20,1), (30, 80), the next text segment at (30,1), (40,80). etc..

Figure 10:
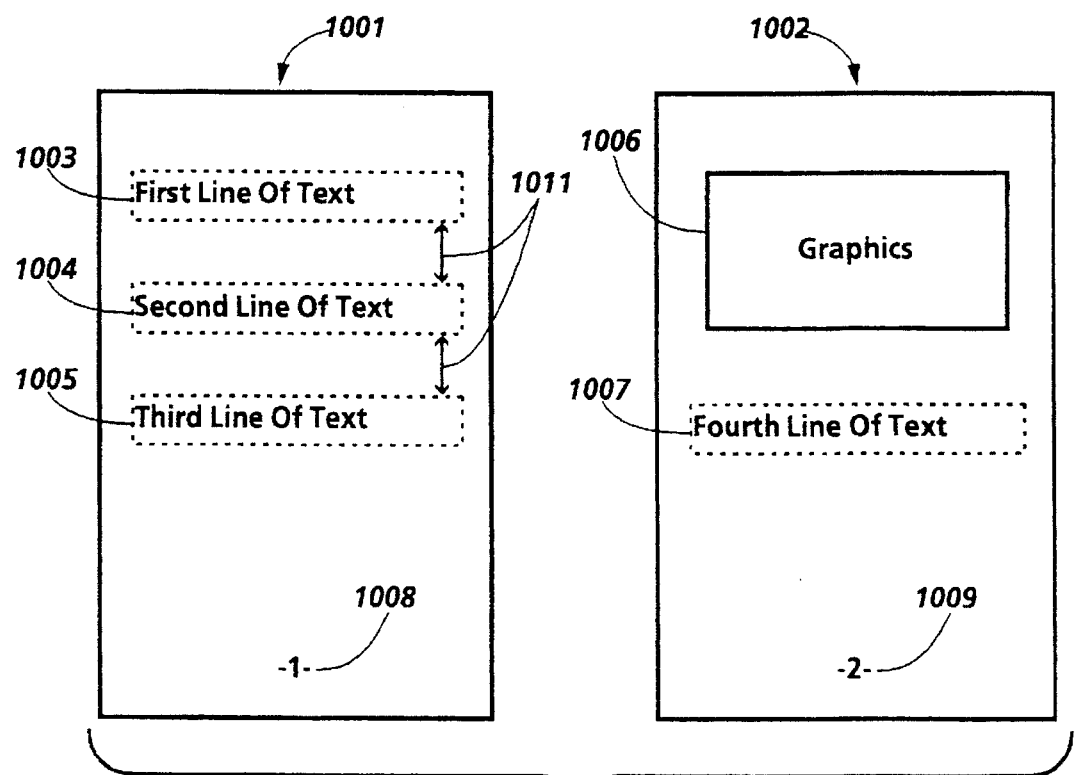
FIG. 10 is an example of multiple pages prior to coalescence onto a single page.
Figure 11:
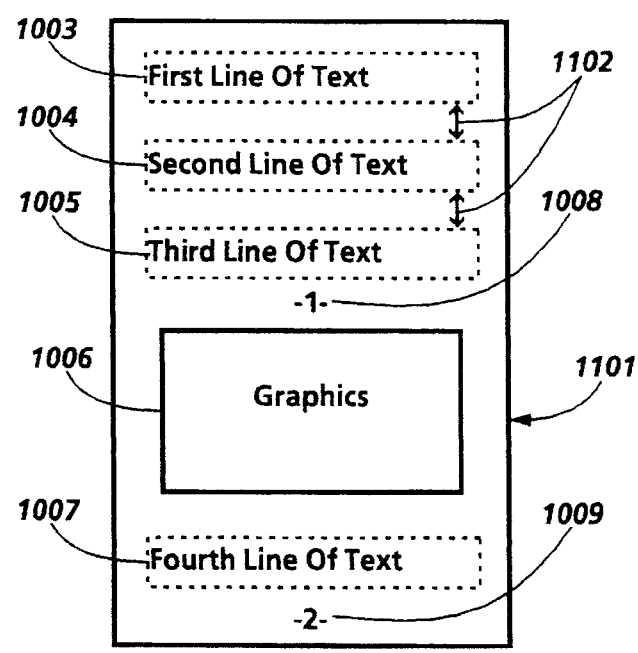
FIG. 11 illustrates the results of the multiple pages of FIG. 10, being coalesced onto a single page.

FIGS. 10 and 11 are illustrative of the combining of two document pages. Referring to FIG. 10, a first page 1001 and a second page 1002 are to be combined. Page 1001 is comprised of a first line of text 1003, a second line of text 1004 and a third line of text 1005. The respective lines of text 1003-1004 are separated by a distance 2X 1011. The page 1002 is comprised of graphics 1006 and a fourth line of text 1007. Further, each of page 1001 and 1002 have page number indicators, 1008 and 1009, respectively.

When the single space processing is performed, the resulting page is as illustrated in FIG. 11. Referring to FIG. 11, a page 1101 contains the first line of text 1003, second line of text 1004 and third line of text 1005 now separated by distance X 1102. The graphics 1006 and fourth line of text 1007 are also positioned on the resulting page. Finally, each of the page indicators 1008 and 1009 illustrate the pages where the text originated.

Alternatively, the page indictors could be omitted or the pages in the document numbered to reflect the actual number of pages.

Thus, a reprographic device having means for adjusting the distance between lines of text, is disclosed.

What is claimed:

1. A reprographic device comprising:

input means for permitting a user to specify a segment spacing decrement factor, said segment spacing decrement factor indicating a user specified spacing between segments on a copy of a medium;

a scanner element for converting the contents of a medium to a bit-mapped representation;

print page storage means for storing a combined bit mapped representation;

a printer element for printing said combined bit-mapped representation; and an image processor for combining one or more bit-mapped representations of a medium to create said combined bit-mapped representation, said image processor comprising:

receiving means for receiving a first bit mapped representation of a medium and a second bit-mapped representation of a medium;

segmentation means for segmenting said first bit mapped representation of a medium and said second bit mapped representation of a medium into a plurality of segments;

measuring means for identifying a distance X between a pair of adjacent segments; and layout means for laying out adjacent segments of said first bit mapped representation of a medium and said second bit mapped representation of a medium separated by a distance based on said segment spacing decrement factor and said distance X in said print page storage means to create said combined bit-mapped presentation.

2. The reprographic device as recited in claim 1 wherein said layout means is further comprised of means for placing a first page indicator at a suitable location in said combined bit mapped representation to identify said first bit mapped representation of a medium and a second page indicator at a suitable location in said combined bit mapped representation to identify said second bit mapped representation of a medium.

3. The reprographic device as recited in claim 1 wherein each of said plurality of segments is comprised of a line of text.

4. The reprographic device as recited in claim 1 wherein said plurality of segments is comprised of line of text segments and non-text segments.

5. The reprographic device as recited in claim 4 wherein said measuring means measures a distance X between a pair of adjacent line of text segments.

6. The reprographic device as recited in claim 1 wherein said input means is a labeled switch accessible to a user and embedded on said reprographic device.

7. The reprographic device as recited in claim 1 wherein said image processor is further comprised of means for identifying a bit mapped representation of a medium as a form.

8. The reprographic device as recited in claim 7 wherein said input means is comprised of a checkbox on a form.

9. On a reprographic device, a method for reducing the number of pages need to reproduce a multi-page document, said multi-page document having text therein which is at least double spaced, said method comprising the steps of:

a) scanning a first page and a second page of said document to create a bit-mapped image representation of said first page and a bit-mapped image representation of said second page;

b) storing said bit mapped image representation of said first page and said bit mapped image representation of said second page in a temporary storage;

c) segmenting said bit-mapped image representation of said first page and said bit-mapped image representation of said second page into a plurality of segments;

d) storing a segment identifier for each segment, said segment identifier identifying spatial coordinates for a bounding rectangle for said segment in said temporary storage;

e) generating a spacing factor;

f) laying out each of said plurality of segments in a print page memory according to said spacing factor to create a combined image representation; and g) printing said combined image representation stored in said print page memory.

10. The method as recited in claim 9 wherein said step of generating a spacing factor is further comprised of the steps of:

c1) receiving a user specified space decrement value;

c2) measuring the distance between a pair of adjacent segments; and c3) providing said spacing factor as a product of said user specified space decrement value and said measured distance between said pair of adjacent segments.

11. The method as recited in claim 10 wherein said step of laying out each of said plurality of segments in said print page memory is further comprised of the steps of:

f1) retrieving said segment identifier for a first segment;

f2) retrieving said first segment from said temporary storage based on said segment identifier for said first segment;

f3) placing said first segment at a base location in said print page memory;

f4) retrieving said segment identifier for a second segment;

f5) retrieving said second segment based on said segment identifier for said second segment;

f6) determining an address location for said second segment based on the address for said first segment and said spacing factor; and f7) placing said second segment at said determined address location.

12. The method as recited in claim 10 wherein said step of receiving a user specified space decrement value is comprised of the steps of:

a) identifying a medium as a form;

b) extracting from said form said user specified space decrement value.

13. The method as recited in claim 10 wherein said step of receiving a user specified space decrement value is comprised of the steps of:

a) detecting that a switch associated with a predetermined decrement value has been depressed; and b) providing said predetermined decrement value as said user specified space decrement value.

* * * * *